United States Patent [19]
Lee

[11] Patent Number: 6,119,834
[45] Date of Patent: Sep. 19, 2000

[54] VIBRATION DAMPING DEVICE

[76] Inventor: Richard J. Lee, 3146 Kettle Moraine Rd., Hartford, Wis. 53027

[21] Appl. No.: 09/325,248

[22] Filed: Jun. 3, 1999

[51] Int. Cl.[7] ........................................................ F16F 7/10
[52] U.S. Cl. ........................ 188/378; 416/144; 416/500; 188/379
[58] Field of Search .................................... 188/378, 379; 267/136; 244/17.11, 17.13, 17.27; 403/225, 228, 337, 344; 416/500, 140, 144; 181/207

[56] References Cited

U.S. PATENT DOCUMENTS

| | | | |
|---|---|---|---|
| 2,699,696 | 1/1955 | Hahn | 188/378 |
| 3,690,414 | 9/1972 | Aggarwal et al. | 188/378 |
| 4,130,185 | 12/1978 | Densmore | 188/378 |
| 4,350,233 | 9/1982 | Buckley | 188/378 |
| 4,570,608 | 2/1986 | Masterfield | 188/378 |
| 4,706,788 | 11/1987 | Inman et al. | 188/378 |
| 4,892,174 | 1/1990 | Takekado | 188/378 |
| 5,735,257 | 4/1998 | Walk | 188/378 |

*Primary Examiner*—Robert J. Oberleitner
*Assistant Examiner*—Devon Kramer
*Attorney, Agent, or Firm*—Philip J. Lee

[57] ABSTRACT

A device for damping vibration of a vibrating structure, particularly a helicopter cyclic control system, comprises a straight tubular shaft having a metal weight retained within the inside bore of one end, the remainder of the shaft being unweighted, and two elastomeric lined mounting brackets for securing the unweighted portion of the shaft to the vibrating structure, the bracket closest to the unweighted shaft end holding the shaft end with a tighter fit than the other bracket.

17 Claims, 2 Drawing Sheets

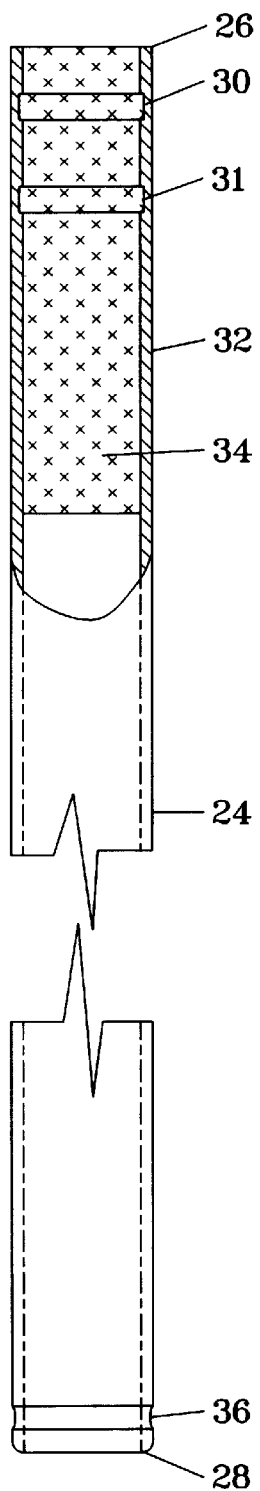
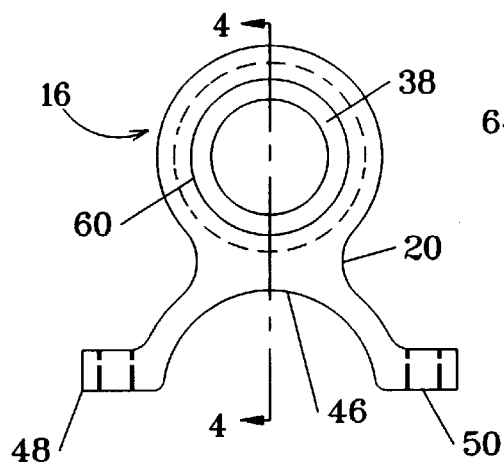
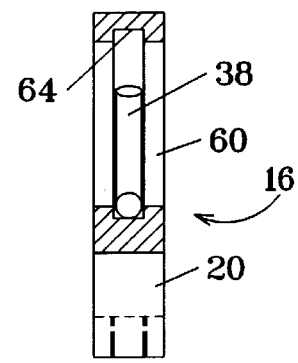
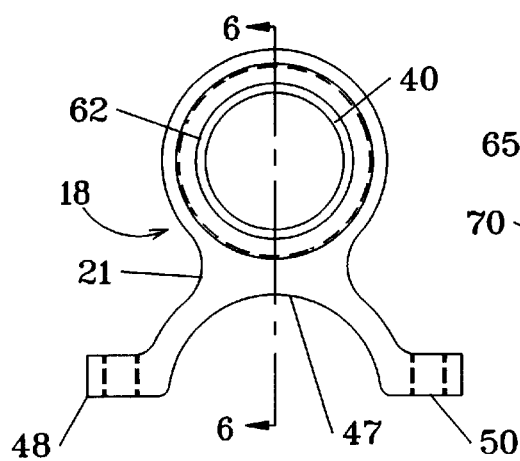
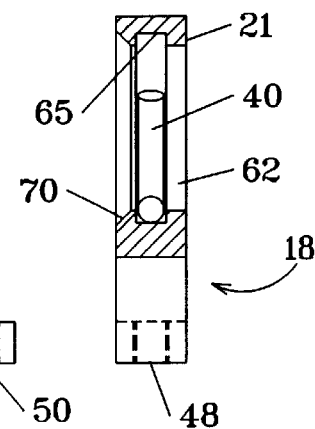

VIBRATION DAMPING DEVICE

BACKGROUND OF THE INVENTION

A. Field of Invention

The present invention relates generally to devices for reducing vibration of a vibrating structure and more particularly to a device for damping vibration of a control system structure.

B. Description of Related Art

It is often necessary or desirable for an operator of equipment to manually and directly control and manipulate a vibrating structure, for example, when the power source causes vibration of equipment that must be controlled manually. The vibration communicated to the operator may be undesirably tiring or uncomfortable or interfere with the control by the operator. Traditional methods of attempting to control vibration include using traditional hydraulic damping mechanisms to reduce the vibration and isolating the operator from the source of vibration to reduce the effect of the vibration. However, traditional hydraulic damping mechanisms are generally relatively heavy and cumbersome and are not desirable for some applications. The method of isolation of the operator from direct connection to the source of vibration may undesirably eliminate some of the control precision and the sensory feedback to the operator that is a beneficial aspect of direct control.

An example of the effect of the communication of vibration to the operator is found in small helicopters. Vibration in helicopter cyclic control systems is frequently caused by the mechanical linkage of the control system with the swash plate which is linked to the main rotor. To control flight direction and attitude, the operator manipulates the cyclic control system to tilt the swash plate, side to side, fore and aft, and any combination thereof. The swash plate also progressively changes the angle of attack of the rotor blades. The advancing rotor blade has a very small angle of attack when in forward flight because the relative wind plus rotor speed results in great lift. However, the retreating blade, has low relative airspeed and must have a large angle of attack to give an equal lift, else the helicopter would not fly level nor straight. For this reason, the pitch of each rotor blade must be rapidly changed twice in each complete rotation. The rapid change of pitch of the rotor blade is frequently accomplished by means of direct mechanical interaction between the swash plate and a rotor pitch controlling arm. The interaction between the swash plate and each rotor pitch controlling arm is rapid and forceful and occurs with each revolution of the rotor. The force of the change of rotor pitch is communicated to the swash plate and causes vibration in the cyclic control system that the pilot uses for flight. At no phase of any flight may the pilot remove his hand from the cyclic control, and therefore, vibration of the cyclic control is tiring and unpleasant for the pilot during long flights.

In large helicopters, costly and complex hydraulic power controls assist the cyclic control system and serve to isolate the pilot from vibration and may also provide hydraulic vibration damping. Smaller helicopters may use weights to absorb the shake; however, the smallest helicopters have no vibration dampening and the vibrations are absorbed by the hand of the pilot. Common vibration damper mechanisms are heavy and could not easily be tuned to the best frequency for optimum results. The need is for a relatively light weight, inexpensive and effective mechanism for reducing vibration experienced by the helicopter pilot from the cyclic control system.

SUMMARY OF THE INVENTION

The present invention comprises a vibration damping device that can be quickly and removably installed on the cyclic control of an existing helicopter as well as manufactured as original equipment. The invention is a vibration damping device that attaches to the cyclic control of the helicopter between the source of the vibration and the portion gripped by the pilot. The device reduces the vibration experienced by the pilot without isolating the pilot from the swash plate control linkage. Therefore, the pilot retains the direct feedback from and control of the swash plate as provided by the original cyclic control system. The vibration damping device comprises a shaft that is weighted at one end and is mounted on the cyclic control by means of two brackets attached to the other, unweighted end of the shaft. The two mounting brackets are separated by a short distance along the longitudinal axis of the device shaft. The mounting brackets are rubber lined using standard "O" rings set in annular grooves to resiliently grip the device shaft. It is believed that the distance between the two mounting brackets controls the frequency that the device oscillates in response to vibration of the cyclic control. Shortening the distance between the two mounting brackets appears to cause the device to oscillate at a lower frequency and lengthening the distance between the two mounting brackets appears to cause the device to oscillate at a higher frequency. By variation of the mounting bracket separation the device can be tuned to oscillate at a frequency that yields the best vibration damping results.

It appears that the effective length of the device shaft is inversely related to the weight necessary to reduce vibration such that lengthening the shaft allows the weight to be reduced without losing damping effect. As an example of the application of the present invention, a vibration damping device in accord with the present invention for use in a Robinson R22-Beta two place helicopter has a shaft that is 12 inches long with an outside diameter of 0.75 inch with an inside diameter of 0.62 inch and a 2.5 inch long section at one end filled with lead alloy, the entire device weighting 10 ounces. The installation of the exemplar on a Robinson R22 helicopter with brackets separated by a distance of 1.96 inches appears to yield optimum damping.

It has been found that the device is more effective if the shaft is held tightly by the lower bracket and more loosely by the upper bracket. For that reason, in the preferred embodiment the bracket groove receiving the elastomeric ring is larger in the upper bracket than in the lower bracket. The outer surface of the unweighted shaft end is formed with an annular groove around the shaft in a plane normal to the shaft axis. The groove is sized and used to retain the elastomeric ring of the lower bracket.

The principal aim of the present invention is to provide a new and improved device to reduce vibration which meets the foregoing requirements and which is capable of being installed on the cyclic control of a helicopter.

Another and further object and aim of the present invention is to provide a new and improved device to reduce vibration which meets the foregoing requirements and which will be economical to manufacture and install.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

BRIEF DESCRIPTION OF THE DRAWINGS

FIG. 2 is a side view of the shaft member of the preferred embodiment of the present invention, the shaft being broken and having the outer surface partially cut away to show the interior weight in cross section.

FIG. 3 is a top view of a upper bracket body of the preferred embodiment of the present invention.

FIG. 4 is a cross sectional view, taken along line 4—4 of FIG. 3, of a upper bracket body of the preferred embodiment of the present invention.

FIG. 5 is a bottom view of a lower bracket body of the preferred embodiment of the present invention.

FIG. 6 is a cross sectional view, taken along line 6—6 of FIG. 5, of a lower bracket body of the preferred embodiment of the present invention.

FIG. 7 is a top view of a bracket clamp of the preferred embodiment of the present invention.

DESCRIPTION OF THE PREFERRED EMBODIMENT

Figure 1:
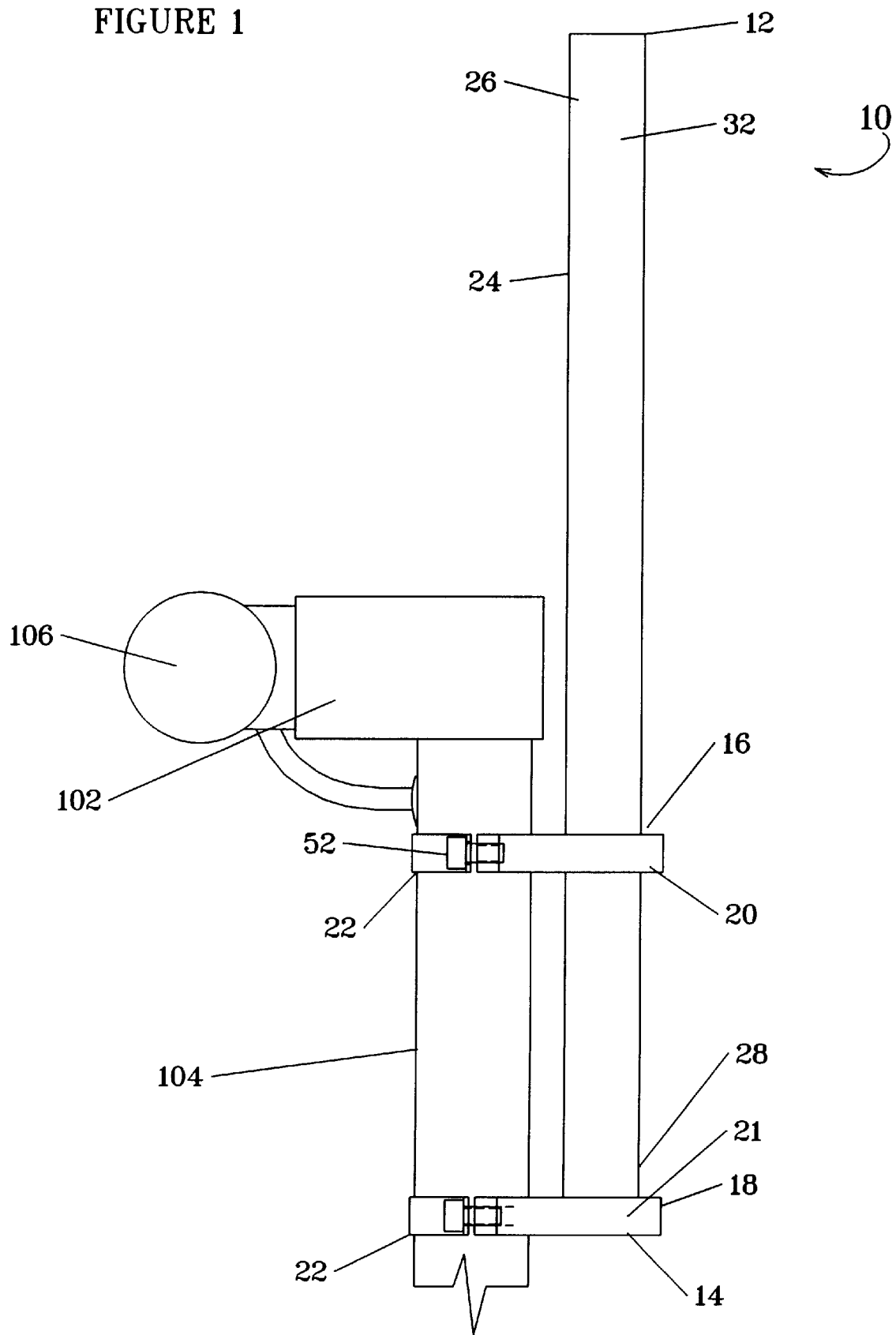
FIG. 1 is a side view of a preferred embodiment of the invention showing the device of the present invention attached to the front of a helicopter cyclic control.

With reference to the Drawings wherein like numerals represent like parts throughout the Figures, a preferred embodiment of the vibration damping device of the present invention is generally designated by numeral 10 in FIG. 1. For the sake of clarity and ease of reference herein, device 10 is referred to as being installed vertically by attachment to the vertical shaft 104 of a cyclic control system 102 of a helicopter (not shown). Accordingly, device 10 is referred to as having a top end 12 and a bottom end 14 and the terms "up", "upper", "upward" or "top" mean toward the top end 12 and the terms "down", "lower", "downward" or "bottom" mean toward the bottom end 14. The use of cyclic control system 102 and the directional conventions are intended merely as exemplars and not as a limitation of the use of the device 10 which can be used with other structures and in other directional orientations.

The typical helicopter cyclic control system 102 has a generally vertical shaft member 104 which supports an upper, laterally extending control member, to which are attached grip members (not shown), by which the pilot grips and controls the cyclic control system 102. Vibration damping device 10 is installed by attachment of an upper mounting bracket 16 and a lower mounting bracket 18 to the cyclic control member 104. Both mounting brackets 16 and 18 are similar in configuration, each respectively comprising a body member 20 or 21 and a clamp member 22. Two identical clamp members 22 are used, each, being formed of a thin metal strip in a semicircular shape corresponding to the radius of the vertical shaft member 104, and with flanges 42 at each end, each flange 42 having a bolt hole 44. Upper mounting bracket body 20 has a semi-circular section 46 corresponding to the radius of the vertical shaft member 104, with two flanged ends 48, each having female threaded bores 50 to receive clamping bolts 52. Lower mounting bracket body 21 has a semi-circular section 47, identical to section 46, corresponding to the radius of the vertical shaft member 104, with two flanged ends 48, each having female threaded bores 50 to receive clamping bolts 52. Both upper mounting bracket 16 and lower mounting bracket 18 are similar in the engagement of the cyclic control vertical member 104. Installation of device 10 involves securing a clamp member 22 to upper bracket body 20, the combination surrounding the cyclic control vertical shaft member 104, and a clamp member 22 to lower bracket body 21, the combination surrounding the cyclic control vertical shaft member 104, and tightening the clamping bolts 52 until each clamping member flange 42 deforms and thereby locks the respective clamping bolt 52.

The vibration damping device 10 comprises a shaft 24 formed from a length of aluminum tubing having a upper end 26 and a lower end 28. The upper shaft end 26 is weighted and in the illustrated preferred embodiment, the weighting is achieved by filling a section 32 with lead alloy which is poured into section 32 in a molten state and secured in place by interior, annular grooves 30 and 31, forming weight 34. To avoid looseness of the weight 34 within section 32 caused by shrinkage of the cooled alloy, the weight 34 may be swaged in place. The outer surface of the unweighted, lower shaft end 28 is formed with an annular groove 36 around shaft 24 in a plane normal to the axis of shaft 24.

The edge of unweighted, lower shaft end 28 is preferably chamfered to ease installation.

Upper mounting bracket body 20 comprises an annular opening 60, which opening 60 lies in the same plane as, and adjacent to the semi-circular section 46 formed by the bracket body. Lower mounting bracket body 21 also comprises an annular opening 62, similar to bracket opening 60, which opening 62 lies in the same plane as, and adjacent to the semi-circular section 47 formed by the bracket body. Both annular openings 60 and 62 are rubber lined, each comprising an annular inner groove. Groove 64 is recessed into the inside wall of upper mounting bracket opening 60 to receive and retain an annular elastomeric bearing 38. Groove 65 is recessed into the inside wall of lower mounting bracket opening 62 to receive and retain an annular elastomeric bearing 40. Standard "O" rings formed of rubber or other suitably elastomeric substance to resiliently grip the device shaft 24 are used for elastomeric bearings 38 and 40. The only differences between the upper mounting bracket 16 and the lower mounting bracket 18 are that the bottom edge 70 of lower bracket body opening 65 is chamfered and that the upper bracket interior groove 64 is cut slightly deeper to provide a slightly greater diameter groove than lower bracket groove 65. Shaft groove 36 is sized and used to retain the elastomeric ring 40 retained in lower mounting bracket 18. The two mounting brackets 16 and 18 are vertically separated from each other by a short distance along the longitudinal axis of the device shaft 24.

The inventor is not a trained physicist, but it is believed that device 10 achieves vibration damping by at least in part absorbing the force of the vibration and in part by returning a countering force to the cyclic control 102 that in part cancels the vibration from the swash plate. It is further believed, and appears from experimentation, that the damping effect of device 10 is directly related to both the length of shaft 24 and the mass of weight 34. Thus, generally, either variable may be reduced if a vibration of lesser amplitude is to be damped or increased a if vibration of greater amplitude is to be damped. Further, one variable must be increased if the other is decreased to achieve an equivalent damping effect. As an example of the application of the present invention, an embodiment of vibration damping device 10 found to be effective in reducing vibration in the cyclic control system of a Robinson R22-Beta two place helicopter has a shaft 24 formed of aluminum tubing with a length of 12 inches, an outside diameter of 0.75 inch, an inside diameter of 0.62 inches and a 2.5 inch long section at upper end filled with 3.07 cubic inches of alloy containing 90 per cent lead comprising weight 34, and the entire device 10 weighting 10 ounces. While the amplitude of the vibration of the cyclic control of the Robinson R22-Beta two place helicopter has not been determined, it is known that the normal rotor speed in flight is between 510 and 530 revolutions per minute and therefore the frequency of the vibration produced and effectively damped by this configuration of device 10 is between 1020 and 1060 cycles per minute. It is therefore anticipated that more forceful vibration may require increasing the length of shaft 24 and/or the mass of weight 34, either or both of which may conversely be reduced to damp less forceful vibrations.

It is further believed that the vertical separation between mounting brackets 16 and 18 controls the frequency that the device 10 oscillates in response to vibration of the cyclic control and the frequency of vibration most effectively damped by device 10. Reducing the separation between mounting brackets 16 and 18 appears to cause device 10 to more effectively damp lower frequency vibrations and, conversely, increasing the separation between mounting brackets 16 and 18 appears to cause device 10 to more effectively damp higher frequency vibrations. A vertical separation between mounting brackets 16 and 18 of 1.96 inches appears to cause the above described specific exemplar of device 10 to most effectively damp the vibration produced in the cyclic control system of a Robinson R22-Beta two place helicopter.

It also appears that device 10 is more effective if shaft 24 is held tightly by lower mounting bracket 18 and more loosely by upper mounting bracket 16. For that reason, upper bracket interior groove 64 is cut slightly deeper to provide a slightly greater diameter groove than lower bracket groove 65. In the specifically described exemplar, the inside diameter of the bottom wall of upper bracket interior groove 64 is 1.020 inches while the inside diameter of the bottom wall of lower bracket interior groove 65 is 0.970 inches.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention. It is specifically to be anticipated that the principles of the present invention may be beneficially applied to damp vibration of other structures with appropriate modifications as required by the particular characteristics of the particular application. The present invention is expected to be particularly useful in applications in which light weight is desirable and in which, for control purposes, it is desired that the operator retain positive and direct control of the vibrating structure.

What is claimed is:

1. A device for damping vibration of a vibrating structure, the device comprising:
   A. A shaft having a weighted section and an unweighted section, and
   B. A mounting bracket securing the unweighted section of the shaft to the vibrating structure the mounting bracket comprising two points of attachment between the unweighted section of the shaft and the vibrating structure.

2. The device of claim 1, wherein the mounting bracket further comprises at least one elastomeric bushing for each point of attachment to the device shaft, the bushings interposed between the device shaft and the bracket with an interference fit, each bushing being compressed between the shaft and the bracket.

3. The device of claim 2, wherein the device shaft is a straight tube.

4. The device of claim 3, wherein the weighted section of the device shaft further comprises a metal weight retained within the inside bore of the tubular device shaft.

5. The device of claim 4, wherein the metal weight is retained within one end of the tubular device shaft.

6. The device of claim 5, wherein the mounting bracket points of attachment to the shaft are separated along the axis of the shaft, one mounting bracket point of attachment being closer to the weighted end of the shaft and one mounting bracket point of attachment being farther from to the weighted end of the shaft.

7. The device of claim 6, wherein the bushing compressed between the shaft and the mounting bracket point of attachment farther from the weighted shaft end is more forcefully compressed than the bushing compressed between the shaft and the mounting bracket point of attachment closer to the weighted shaft end.

8. The device of claim 7, wherein the shaft is about twelve inches in length and about three fourths of an inch in outside diameter.

9. The device of claim 8, wherein about two and one half inches of the shaft is filled with lead alloy and the device weights about ten ounces.

10. A device for damping vibration of a vibrating structure, the device comprising:
    A. A tubular shaft having a weighted section and an unweighted section, and
    B. A first mounting bracket attached between the unweighted section of the shaft and the vibrating structure, and
    C. A second mounting bracket attached between the unweighted section of the shaft and the vibrating structure at a point closer to the weighted end of the shaft than the first mounting bracket.

11. The device of claim 10, wherein each mounting bracket further comprises at least one elastomeric bushing compressed between the shaft and the bracket.

12. The device of claim 11, wherein the bushing compressed between the shaft and the first mounting bracket is more forcefully compressed than the bushing compressed between the shaft and the second mounting bracket.

13. The device of claim 12, wherein both bushings are annular and retained within annular grooves in the mounting brackets.

14. The device of claim 13, wherein the weighted section of the device shaft further comprises a metal weight retained within the inside bore of the tubular device shaft.

15. The device of claim 14, wherein the shaft is about twelve inches in length and about three fourths of an inch in outside diameter and about two and one half inches of the shaft is filled with lead alloy and the device weights about ten ounces.

16. The device of claim 10, wherein each mounting bracket further comprises an opening and the device further comprises a first annular elastomeric bushing surrounding the shaft and retained within the first mounting bracket opening and a second annular elastomeric bushing surrounding the shaft and retained within the second mounting bracket opening.

17. The device of claim 16, wherein each bushing is compressed between and separates the shaft and the mounting bracket that retains it, and wherein the first bushing is more forcefully compressed than the second bushing.

* * * * *